US008508470B2

(12) United States Patent
Moscovitch

(10) Patent No.: US 8,508,470 B2
(45) Date of Patent: Aug. 13, 2013

(54) CURSOR MANAGEMENT SYSTEM

(76) Inventor: Jerry Moscovitch, Toronto (CA)

( * ) Notice: Subject to any disclaimer, the term of this patent is extended or adjusted under 35 U.S.C. 154(b) by 968 days.

(21) Appl. No.: 11/669,684

(22) Filed: Jan. 31, 2007

(65) Prior Publication Data

US 2007/0195060 A1     Aug. 23, 2007

Related U.S. Application Data

(60) Provisional application No. 60/766,611, filed on Jan. 31, 2006.

(51) Int. Cl.
*G09G 5/00*       (2006.01)

(52) U.S. Cl.
USPC ........... 345/156; 345/157; 345/158; 715/764; 715/856; 715/862

(58) Field of Classification Search
USPC ................. 345/156–163, 168–170, 173, 175, 345/1.1, 4
See application file for complete search history.

(56) References Cited

U.S. PATENT DOCUMENTS

| | | | | |
|---|---|---|---|---|
| 5,781,179 A * | 7/1998 | Nakajima et al. | ............. | 345/157 |
| 6,307,535 B1 * | 10/2001 | Kim et al. | ...................... | 345/157 |
| 6,816,129 B1 * | 11/2004 | Zimmerman | .................. | 345/1.1 |
| 6,970,159 B2 * | 11/2005 | Gray | ............................. | 345/173 |
| 7,102,616 B1 * | 9/2006 | Sleator | .......................... | 345/158 |
| 2006/0143571 A1 * | 6/2006 | Chan | ............................. | 715/764 |
| 2006/0168531 A1 * | 7/2006 | Sato | ............................. | 715/764 |

OTHER PUBLICATIONS

Ken Hinkley, Gonzalo Ramos, Francois Guimbretiere, Patrick Baudisch, Marc Smith; Stitching: Pen Gestures that Span Multiple Displays; dated Oct. 6, 2003 at top left of front page.
Hrvoje Benko, Steven Feiner; Multi-Monitor Mouse; Apr. 2005.
Robert Ball, Andrew Sabri, Michael Varghese, Chris North; More Pixels Wins the War; CHI Conference; date of 2006 appears at top left of front page.
Mark Ashdown; Yoichi Sato; Attentive Interfaces for Multiple Monitors CHI 2005 Workshop on distributed Display Environments, Portland Oregon, USA, Apr. 3, 2005.

* cited by examiner

*Primary Examiner* — Kevin M Nguyen
*Assistant Examiner* — Kenneth B Lee, Jr.

(57) ABSTRACT

An N-screen computer display system is described that includes N panels having N screens capable of displaying a cursor. The system also includes a cursor repositioning component having N screen selectors associated with the N screens. Each of the N screen selectors can be activated to reposition the cursor such that if a particular one of the N screen selectors is activated, the cursor is repositioned to a location on a particular screen associated with the particular one of the N screen selectors. Also described is a cursor location identifier to identify the location of a cursor in a computer display system.

8 Claims, 6 Drawing Sheets

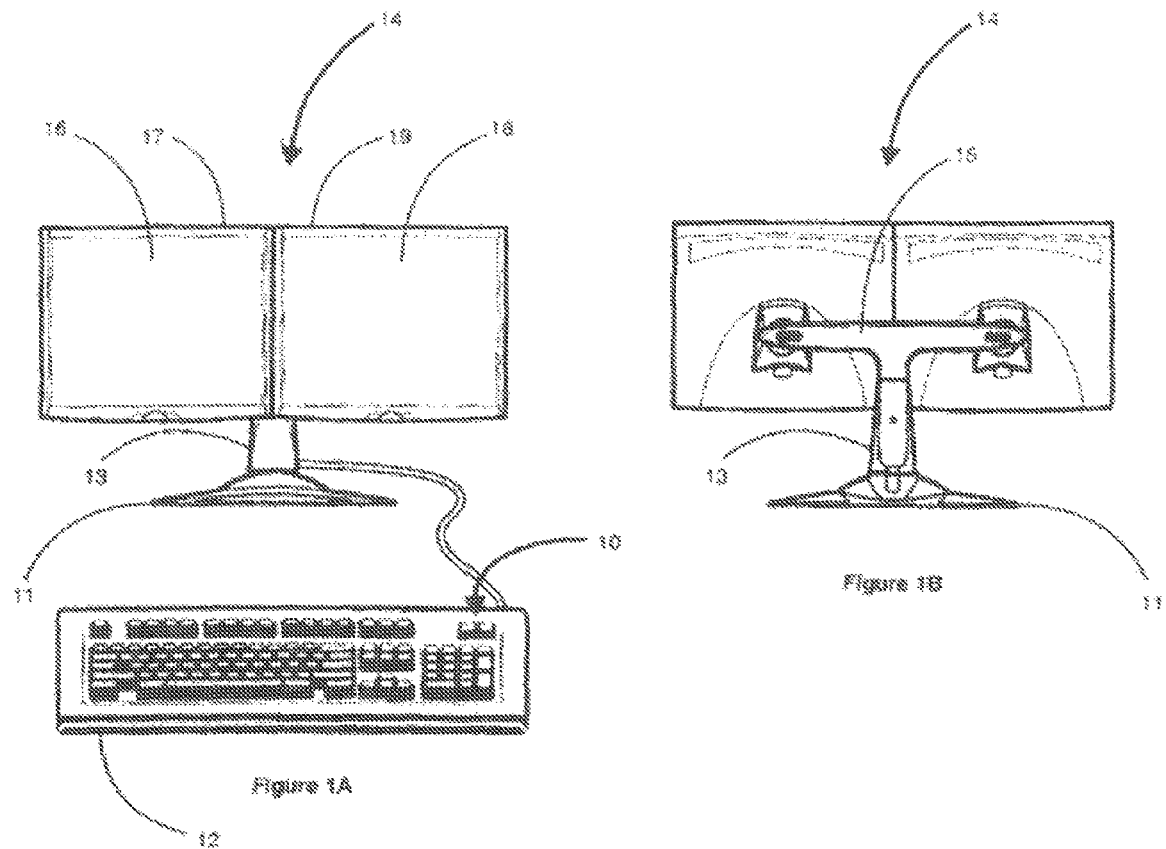
Figure 1A
Figure 1B
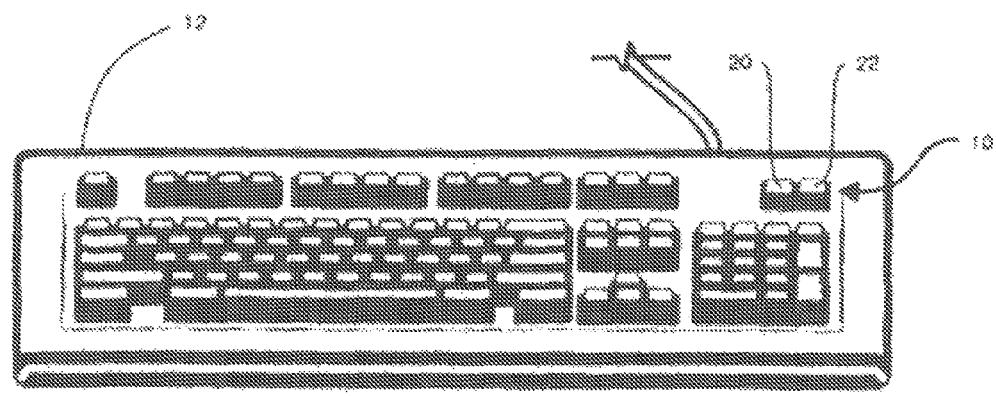
Figure 1C

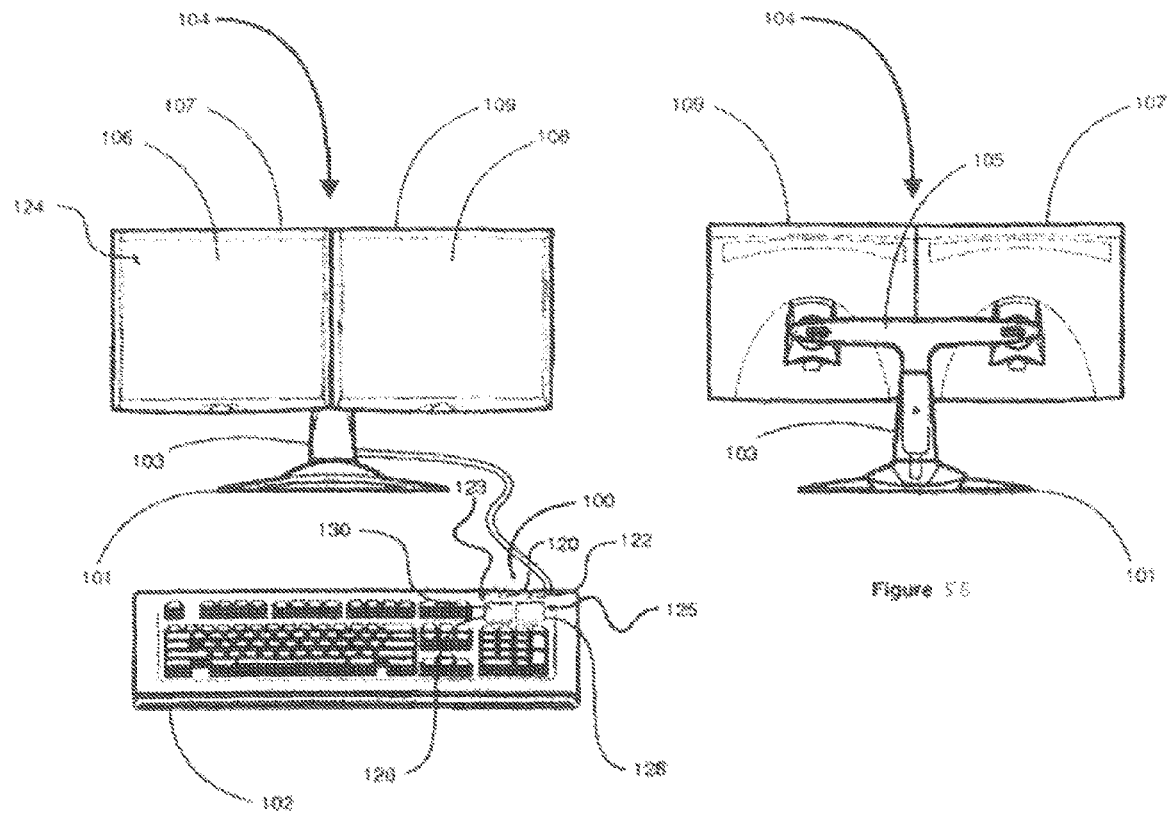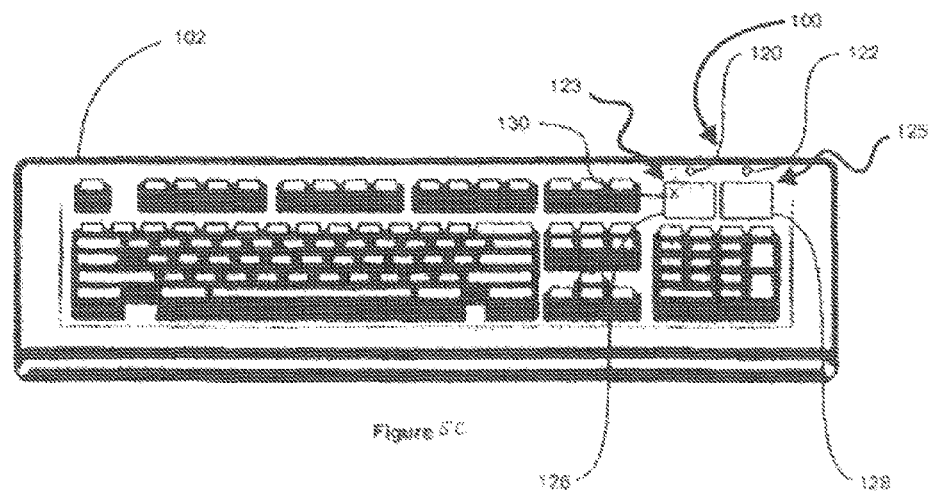

CURSOR MANAGEMENT SYSTEM

CROSS-REFERENCE TO RELATED APPLICATION

This application claims priority to U.S. patent application Ser. No. 60/766,611, filed Jan. 31, 2006.

FIELD OF INVENTION

The invention relates to computer systems, and more particularly to a cursor management system.

BACKGROUND OF THE INVENTION

One problem that can arise when working on a computer is that the user may lose track of the position of the cursor. This problem is exacerbated on computer systems having more than one screen. One crude way of locating the cursor is to jiggle the mouse that controls the cursor in the hope of finding the cursor. This technique leaves much to be desired, since even with this approach, the cursor can still blend into the background, making it difficult to locate.

An associated problem that can arise when using a multiple screen computer system is that a lot of inconvenient mouse motion is required to move the cursor from one screen to the other. For example, in a horizontal three-screen configuration, it is likely that several mouse strokes are needed to move the cursor across the full width of the three screens.

BRIEF DESCRIPTION OF THE DRAWINGS

FIG. 1A shows a front view of a two-screen computer display system in accordance with the principles of the present invention.

FIG. 1B shows a back view of a two-screen computer display system in accordance with the principles of the present invention.

FIG. 1C shows the cursor repositioning component of FIG. 1A.

FIG. 5A shows a front view of a two-screen computer display system in accordance with the principles of the present invention.

FIG. 5B shows a back view of a two-screen computer display system in accordance with the principles of the present invention.

FIG. 5C shows the cursor location identifier of the two-screen display system of FIGS. 5A and 5B.

SUMMARY OF THE INVENTION

Figure 2:
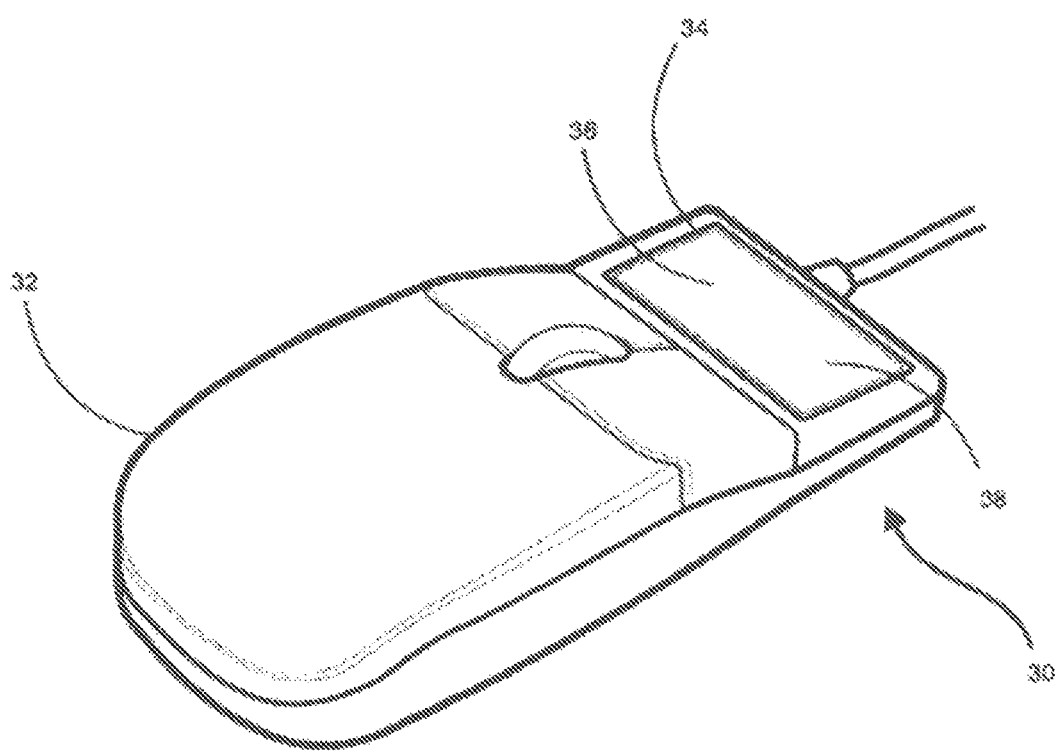
FIG. 2 shows a computer mouse having a cursor repositioning component in accordance with the principles of the present invention.

Described herein is an N-screen computer display system, where N can be any integer greater than zero. The system includes N panels having N screens capable of displaying a cursor, and a cursor repositioning component having N screen selectors associated with the N screens. Each of the N screen selectors can be activated to reposition the cursor such that if a particular one of the N screen selectors is activated, the cursor is repositioned to a location on a particular screen associated with the particular one of the N screen selectors.

Also described herein is an N-screen computer display system that includes N panels having N screens capable of displaying a cursor. The display system further includes a cursor location identifier that displays a sign to indicate the location of the cursor. The cursor location identifier can include N screen identifiers associated with the N screens such that a particular one of the N screen identifiers is activated when the cursor is located in a particular screen associated with the particular one of the N screen identifiers.

The cursor repositioning component and the cursor location identifier can be combined to provide both cursor repositioning and location identifying capabilities.

DESCRIPTION OF THE INVENTION

To address the aforementioned problems associated with cursor identification and motion, a system is described herein that makes both moving and finding the location of the cursor easier.

Referring to FIGS. 1A and 1B, a front view and a back view of a two-screen computer display system 14 are shown. The system 14 includes a cursor repositioning component 10, which is provided on a keyboard 12 connected to the two-screen display system 14. The system 14 further includes a first panel 17 having a first screen 16, and a second panel 19 having a second screen 18. The display system 14 also includes a base 11, a column 13 and an arm 15. FIG. 1C shows the cursor repositioning component 10 of FIG. 1A. The cursor repositioning component 10 includes a first screen selector 20 and a second screen selector 22. In the embodiment shown, the first screen selector 20 is a push button or key, which can be pushed by a user to reposition a cursor (not shown) to a location on the first screen 16. Likewise, the second screen selector 22 is a push button, which can be pushed by a user to reposition the cursor to a location on the second screen 18. The specific location on the respective screen to which the cursor is repositioned can be configurable. For example, by pushing the first screen selector 20, the cursor may be repositioned to the top left corner of the first screen 16.

In a different embodiment, the cursor repositioning component can include a small touch-screen LCD display located on the keyboard. (Such an LCD display is shown in FIG. 2, where there it is located on a mouse instead of the keyboard.) Thus, in this embodiment, the first screen selector would be a left side of the touch screen LCD display, and the second screen selector would be a right side of a touch screen LCD display on the keyboard. (Alternatively, two small separate LCD touch screens can be employed.) Touching the left side of the small touch-screen LCD display, for example, can reposition the cursor to the first screen of the two-screen display system, while touching the right side of the small touch-screen LCD display can reposition the cursor to the second screen of the two-screen display system. More generally, touching one portion of the small touch-screen display system repositions the cursor to the first screen, while touching a second portion repositions the cursor to the second screen.

It should be understood that instead of or in addition to the keyboard, the cursor repositioning component could be disposed in or on other components of the multi-screen display system. For example, the cursor repositioning component can be disposed on a base, a column, an arm, a screen frame or other part of the panel, a computer tower housing a CPU, or a mouse of the computer display system. Indeed, any convenient location of the computer display system can be used to dispose thereon the cursor repositioning component. The cursor repositioning system can also be disposed in more than one of these elements (for example, the cursor repositioning system can be disposed on the mouse and on the keyboard). Moreover, the cursor repositioning component need not be in physical contact with any other component of the multi-screen display system. For example, in one embodiment, the cursor repositioning component can be a handheld component that communicates with the rest of the display system via electromagnetic radiation. Such a "wireless" component may be especially useful with display walls, which contain a large number of displays (for example, six or more). A user would be able to manage the cursor by wirelessly transmitting signals to the display wall using the cursor repositioning component. In addition, the cursor repositioning system can include a voice recognition system that can recognize voice commands for moving on identifying the cursor. For example, a command of "left" can result in the cursor moving to the left screen of a horizontal, two-screen display system. Thus, in this example, two screen selectors are provided in the cursor repositioning component, which selectors include hardware and/or software that can process voice commands. When a particular voice command is processed by a screen selector, a signal is transmitted to the appropriate panel to reposition the cursor. In this way, the screen selectors are conveniently voice activated.

It should also be understood that one or more keys of a conventional keyboard could be used to move or identify the cursor. Thus, simultaneously pressing two keys can cause the cursor to reposition to a left screen, while pressing another set of keys can result in the cursor moving to a right screen.

Referring to FIG. 2, an embodiment of the present invention is provided in which a cursor repositioning component 30 is disposed on a mouse 32. The cursor repositioning component 30 includes a small touch-screen LCD display 34. The small touch-screen LCD display 34 includes a first selector 36, which is a first portion of the touch-screen LCD display 34, and a second selector 38, which is a second portion of the touch-screen LCD display 34. As described above, by selecting the first selector 36, the cursor is repositioned to the first screen (not shown in FIG. 2), and by selecting the second selector 40, the cursor is repositioned to the second screen (not shown in FIG. 2). It should be understood that instead of the small touch-screen LCD display 34, the cursor repositioning component 30 can include push buttons, which, as described above with reference to FIGS. 1A, 1B and 1C, can be pushed to reposition the cursor.

Figure 3A:
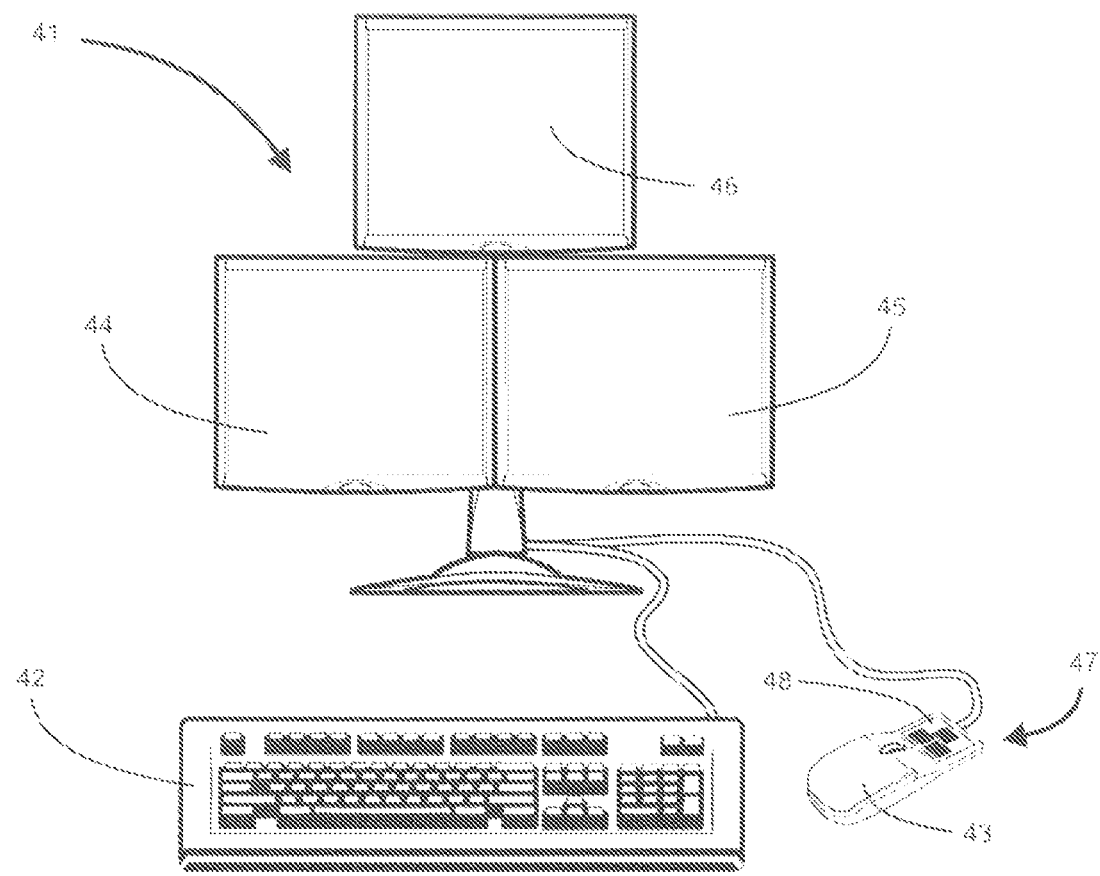
FIG. 3A shows a three-screen display system according to the principles of the present invention.
Figure 3B:
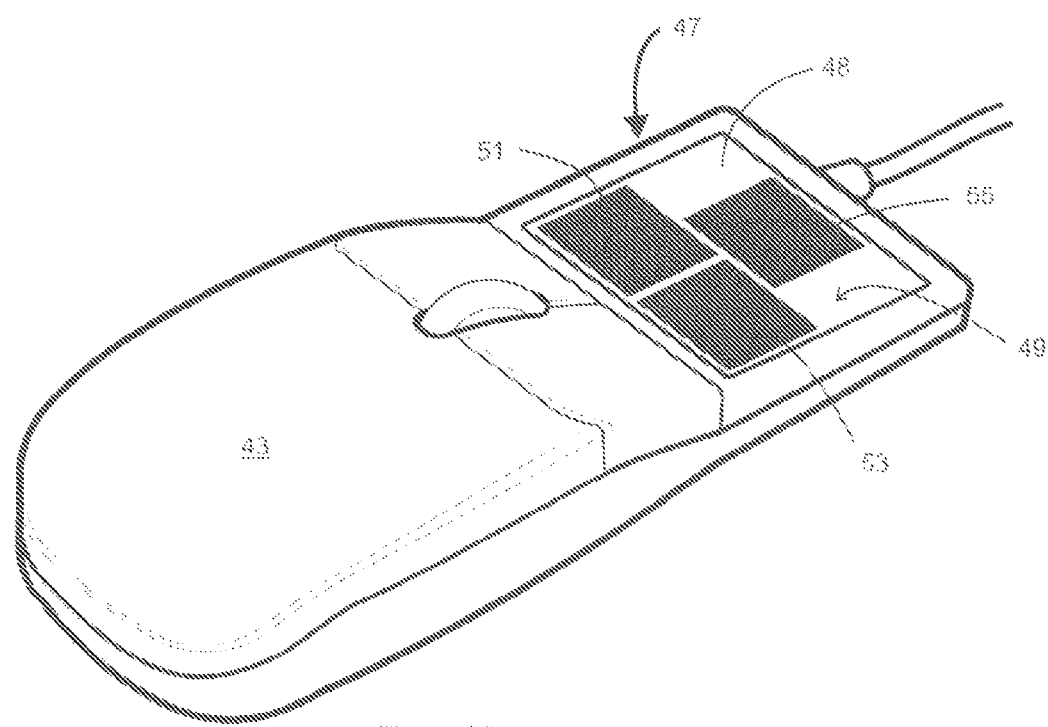
FIG. 3B shows a touch screen display of the cursor repositioning component of the three-screen display system shown in FIG. 3A.

In another embodiment shown in FIGS. 3A and 3B, an electronic representation of the screens of the multi-screen display system can be displayed, with the correct screen geometry. FIG. 3A shows a three-screen display system 41 in a pyramid geometry having a keyboard 42, a mouse 43 and three screens 44, 45, 46. The multi-screen display system also includes a cursor repositioning component 47 that has a touch screen display 48 on the mouse 43, as shown also in FIG. 3B. The touch screen display 48 displays an electronic image 49 representing the three screens 44, 45, 46. The touch screen display 48 also has a first screen selector 51, a second screen selector 53, and a third screen selector 55, which are areas on the display 48 that correspond to the respective three screens, 44, 45 and 46, and which are sensitive to touch. In particular, touching a particular screen selector causes the cursor to reposition to a particular screen (one of screens 44, 45, and 46) associated with the particular screen selector.

Software can be included in the multi-screen display system that allows a user to input the correct geometry to be displayed on the touch screen display. This geometry would correspond to the actual screen geometry of the multi-screen display system. Such a software application could involve typing in words such as "three-screen pyramid," or "three-screen horizontal," or otherwise selecting options therefor. For example, the application can be graphics based and might involve the user moving representative images of screens to define the particular geometry. Any other appropriate method for providing the number and geometry of the screens can be used to display the corresponding image on the touch screen display.

Figure 4:
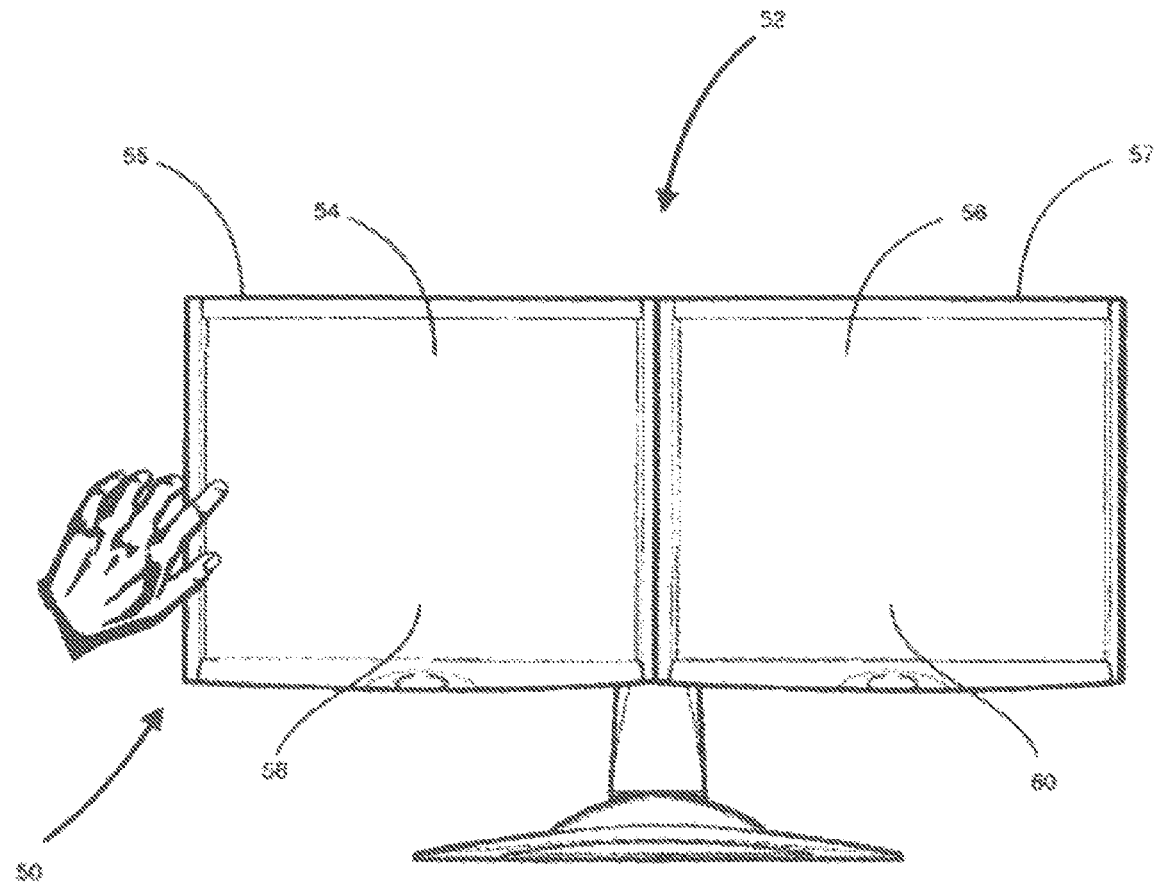
FIG. 4 shows a two-screen display system having a different embodiment of a cursor repositioning component in accordance with the principles of the present invention.

Referring to FIG. 4, another embodiment of the present invention is provided in which a cursor repositioning component 50 is provided in a two-screen display system 52 having a first panel 55 having a first screen 54, and a second panel 57 having a second screen 56. The cursor repositioning component 50 includes a first selector 58, which is the entire face (or alternatively only a portion of the face) of the first screen 54, and a second selector 60, which is the entire face (or alternatively only a portion of the face) of the second screen 56. The first screen 54 and the second screen 56 are touch screens, which are sensitive to touch. Touching the first selector 58 (i.e., the front face of the first screen 54) repositions the cursor on the first screen 54, while touching the second selector 60, repositions the cursor on the second screen 56. The exact location to which the cursor is repositioned in the respective screens can be user defined, or pre-determined.

The aforementioned display systems having cursor repositioning components can be generalized for N-screen display systems. A cursor repositioning component for an N-screen display system has N selectors associated with the N screens. Selecting a particular selector, by pushing, touching, or any other appropriate means, causes the cursor to reposition to the screen associated with the particular selector.

Advantageously, the cursor repositioning components described above are a means to more efficiently move the cursor from one screen to the next. Thus, in traditional multi-screen environments, to move one cursor from one screen to the other, one has to move the mouse, often repeatedly, to slide the cursor from its present location to its desired location. The cursor repositioning components described above provide a method of moving the cursor from one screen to the next without having to slide the cursor using mouse movements. An ancillary benefit of the cursor repositioning component is that it helps identify the location of a cursor, which is especially useful when using a multi-screen display system. If a user loses the position of the cursor, the cursor repositioning can be used to find the cursor again. Other means to identify the location of the cursor are described below.

Referring to FIGS. 5A and 5B, a front view and a back view of a two-screen display system 104 are shown having a cursor location identifier 100 disposed on a keyboard 102. The system 104 includes a first panel 107 having a first screen 106 and a second panel 109 having a second screen 108. The display system 104 also includes a base 101, a column 103 and an arm 105. FIG. 5C shows the cursor location identifier 100 on the keyboard 102 of FIG. 5A. The cursor location identifier 100 includes a first screen identifier 120 and a second screen identifier 122. In the embodiment shown, the first screen identifier 120 is a light-emitting device, which is activated when a cursor 124 is in the first screen 106. Likewise, the second screen identifier 122 is a light-emitting device, which is activated when the cursor 124 is in the second screen 108.

The cursor location identifier 100 allows a user to immediately ascertain in which of screen 106 or 107 the cursor 124 is located.

The cursor location identifier can in addition, or instead, include another first screen identifier 123 in the form of a first small LCD display 126 and another second screen identifier 125 in the form of a second small LCD display 128, both located on the keyboard 102. The LCD displays 126 and 128 are typically smaller than the screens 106 and 108. A marker 130, which is distinct from the cursor 124, is displayed on the first small LCD display 126 when the cursor 124 is on the first screen 106. Likewise, the marker 130 is displayed on the second small LCD display 128 when the cursor 124 is on the second screen 106. Moreover, the location of the marker 130 on the small LCD screen 125 or 128 is indicative of the location of the cursor 124 on the respective screen 106 or 108. Thus, in FIG. 5A, the cursor 124 is on the top left corner of first screen 106, and, consequently, the marker 130 is displayed on the top left corner of the first small LCD screen 126.

It should be understood that instead of having N screen identifiers in the form of N display screens 126 and 128, the N screen identifiers can instead by N portions of one display. Thus, for a horizontal two-screen display system, the two screen identifiers can be the left part and the right part of one display, associated with the left screen and the right screen of the display system, respectively. A marker on the one display having the two screen identifiers can indicate the location of the cursor. In another embodiment, one display can show an image of the N display screens, as shown in FIG. 4B, and discussed above. The marker or sign can be shown on the image to show the location of the cursor.

It should also be understood that the screen identifiers need not be LCD screens, but can instead include CRT, plasma, or projection screens. Moreover, instead of or in addition to the keyboard, the cursor location identifier can be disposed on or in other components of the multi-screen display system. For example, the cursor location identifier can be disposed on a base, a column, an arm, a screen frame, a computer tower or a mouse of the computer display system. Indeed, any convenient location of the computer display system can be used to dispose thereon the cursor location identifier. Moreover, both the cursor location identifier and the cursor repositioning component could be stand alone units, in electronic or wireless communication with other components of the multi-screen display system, that could be housed in a separate housing for resting on a work surface, or perhaps for removably attaching to various locations of the multi-screen display system.

Figure 6:
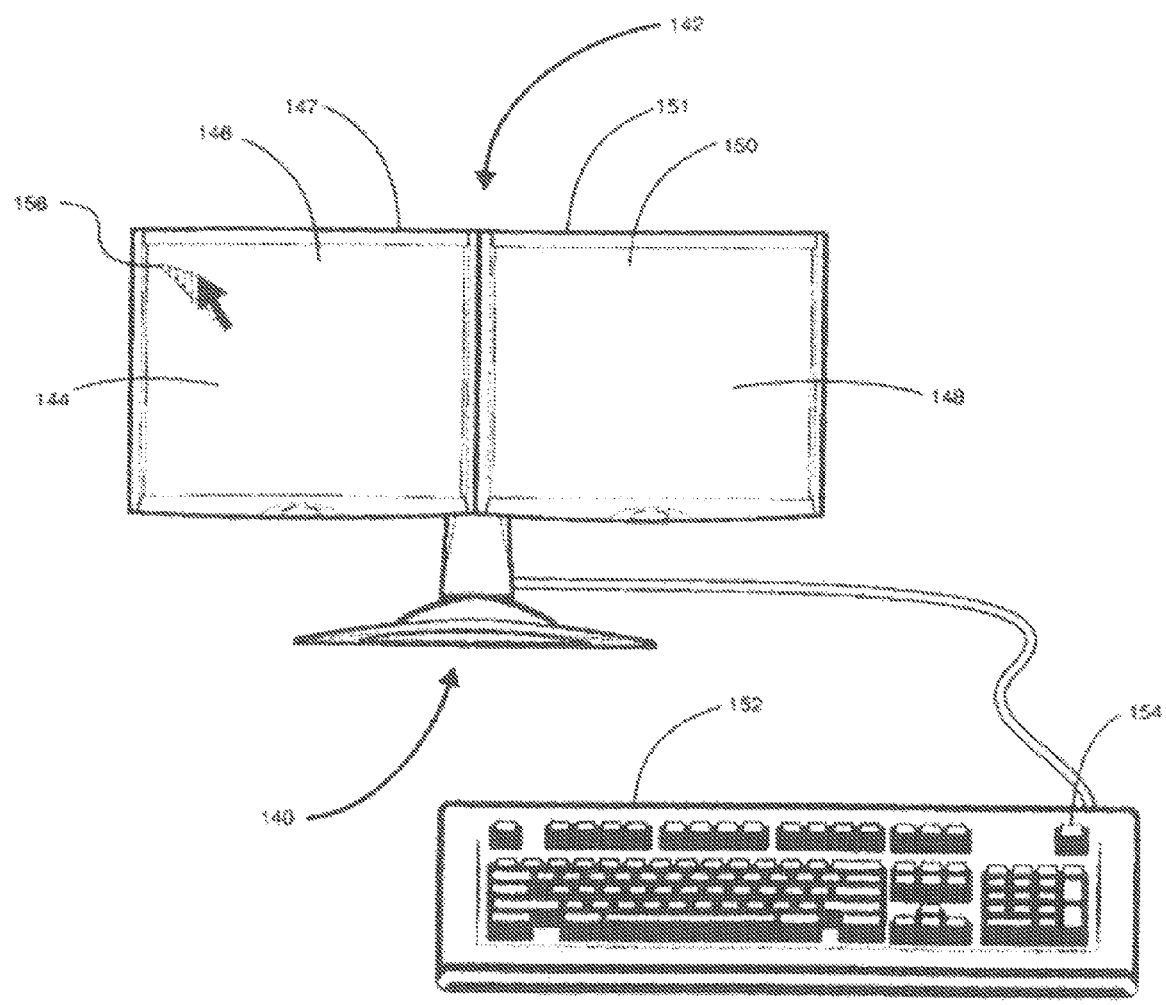
FIG. 6 shows another embodiment of a two-screen display system having a cursor location identifier in accordance with principles of the present invention.

Referring to FIG. 6, a two-screen display system 140 is shown having a cursor location identifier 142. The system 140 includes a first panel 147 having a first screen 146, and a second panel 151 having a second screen 150. The cursor location identifier 142 includes a first screen identifier 144 that coincides with the first screen 146, and a second screen identifier 148 that coincides with the second screen 150 of the display system 140. The system 140 also includes a keyboard 152 having a selection button or element 154. In other embodiments, the selection element can reside in any other part of the display system, such as the panels, column, arm, base and mouse, or in a separate housing. Depressing the selection button 154 causes a cursor 156 on the first screen identifier 144 (i.e., the first screen 146) or the second screen identifier 148 (i.e., the second screen 150) to temporarily, for instance for a few seconds, become more visible. For example, the cursor 150 can temporarily enlarge, can be highlighted by changing the immediate background of the cursor 156, and/or can be made to move to allow the user to identify the cursor 156. In FIG. 6, in response to depressing the selection button 154, the cursor 156 is enlarged and with ghosting. After a few seconds, the cursor 156 returns to a normal size and the ghosting disappears.

For an N-screen display system, fewer than N screen identifiers can be used in some embodiments. For example, consider a computer system having two horizontal screens (such as in FIG. 1A). Consider further the mouse shown in FIG. 2 for use in such a two-screen display system. In one embodiment, a single screen identifier is used that includes the single touch-screen LCD display 34. In addition to acting as a part of the cursor repositioning component, as described above, the display 34 can also act as a cursor location identifier that exhibits the word "left," when the cursor is in the left screen, or the word "right," when the cursor is in the right screen. If the user of the display system "loses" the cursor, a quick glance at the display 34 will indicate in which screen the cursor can be found.

The N screen identifier(s) can reside on the mouse, such as the display 34. It should be understood that, in other embodiments, the display that corresponds to the N screen identifiers could instead by disposed in other locations, such as the keyboard, the base, and/or the column of the multi-screen display system. Indeed, the display could be one of the two horizontally arranged screens of the above example. In general, a portion of one or more of the N screens of an N-screen display system can be used to display a word or symbol indicative of the location of the cursor.

Thus, the N screen identifiers can be one or more devices that manifest one of N possible, telltale signs (such as different words, symbols, or lights) at predetermined and/or easily identifiable positions that indicate the location of the cursor.

Instead of a visual sign, an auditory signal might also be used. Thus, pressing a particular key on the keyboard, for instance, could cause the computer system to enunciate the word "left," if the cursor is in the left screen, or the word "right," if the cursor is in the right screen.

The embodiments described above are exemplary only and are not meant to limit the scope of the invention, which is defined by the following claims.

What is claimed is:

1. An N-screen computer display system comprising:
N panels having N screens capable of displaying a cursor at a cursor location on one of the N screens; and
a cursor location identifier disposed apart from the cursor location that displays a sign to indicate to a user the location of the cursor, wherein the cursor location identifier includes N screen identifiers associated with the N screens such that a particular one of the N screen identifiers is activated when the cursor is located in a particular screen associated with the particular one of the N screen identifiers.

2. The system of claim 1, wherein each of the N screen identifiers includes a light emitting diode, a particular one of the N light emitting diodes lighting up when the cursor is located in the particular screen associated with the particular one of the N light emitting diodes.

3. The system of claim 2, wherein the N screen identifiers are disposed in one of a keyboard and a mouse that are in electronic communication with the N panels.

4. The system of claim 1, wherein each of the N screen identifiers includes a display screen for showing a sign indicative of the location of the cursor.

5. An N-screen computer display system comprising:
N panels having N screens capable of displaying a cursor at a cursor location on one of the N screens; and a cursor location identifier disposed apart from the cursor location that displays a sign to indicate to a user the location of the cursor, wherein the cursor location identifier includes at least one display screen, which is smaller than any of the N screens of the N panels, for displaying a sign that is indicative of the location of the cursor in any of the N screens.

6. The system of claim 5, wherein an image corresponding to the number and geometry of the N screens is displayed on the at least one display screen, the sign being displayed on the image.

7. The system of claim 1, wherein the cursor location identifier is disposed on one of the N screens.

8. An N-screen computer display system comprising:

N panels having N screens capable of displaying to a user a cursor at a cursor location on one of the N screens; and a cursor location identifier disposed apart from the cursor location that displays a sign to indicate to the user the location of the cursor, the cursor location identifier including N screen identifiers associated with the N screens such that a particular one of the N screen identifiers is activated when the cursor is located in a particular screen associated with the particular one of the N screen identifiers, wherein the N screen identifiers are disposed in one of a keyboard and a mouse that are in electronic communication with the N panels.

\* \* \* \* \*